United States Patent
Hofer et al.

(10) Patent No.: US 9,646,242 B2
(45) Date of Patent: May 9, 2017

(54) BOOSTER ANTENNA, CONTACTLESS CHIP ARRANGEMENT, ANTENNA STRUCTURE AND CHIP ARRANGEMENT

(71) Applicant: Infineon Technologies AG, Neubiberg (DE)

(72) Inventors: Guenter Hofer, St. Oswald (AT); Gerald Holweg, Graz (AT); Walther Pachler, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/192,895

(22) Filed: Feb. 28, 2014

(65) Prior Publication Data

US 2014/0246503 A1 Sep. 4, 2014

(30) Foreign Application Priority Data

Mar. 1, 2013 (DE) ........................ 10 2013 102 051

(51) Int. Cl.
| | | |
|---|---|---|
| G06K 19/077 | (2006.01) | |
| H01Q 7/00 | (2006.01) | |
| H01Q 1/22 | (2006.01) | |
| H01Q 1/38 | (2006.01) | |
| H01Q 9/20 | (2006.01) | |
| H01Q 9/42 | (2006.01) | |
| H01Q 21/30 | (2006.01) | |

(52) U.S. Cl.
CPC . *G06K 19/07794* (2013.01); *G06K 19/07767* (2013.01); *H01Q 1/2225* (2013.01); *H01Q 1/38* (2013.01); *H01Q 7/00* (2013.01); *H01Q 9/20* (2013.01); *H01Q 9/42* (2013.01); *H01Q 21/30* (2013.01)

(58) Field of Classification Search
CPC .................. G06K 19/07767; G06K 19/07794
USPC ......................................................... 235/492
See application file for complete search history.

(56) References Cited

U.S. PATENT DOCUMENTS

| | | | |
|---|---|---|---|
| 2007/0171992 A1* | 7/2007 | Shameli ................. | H04L 27/02 375/257 |
| 2008/0036536 A1* | 2/2008 | Khorramabadi .... | H01F 17/0013 330/252 |
| 2008/0062066 A1* | 3/2008 | Arai ..................... | H01Q 1/2208 343/867 |
| 2009/0033467 A1 | 2/2009 | Finocchiaro et al. | |

(Continued)

OTHER PUBLICATIONS www.antenna-theory.com, Antennas: Inverted-F Antenna (IFA), Oct. 12, 2012, <https://web.archive.org/web/20121012040304/http://www.antenna-theory.com/antennas/aperture/ifa.php> (captured on Dec. 23, 2016).*

(Continued)

*Primary Examiner* — Toan Ly
(74) *Attorney, Agent, or Firm* — Viering, Jentschura & Partner mbB

(57) ABSTRACT

In various embodiments, a booster antenna for a chip arrangement is provided. The booster antenna includes: a first circuit, which forms a first resonant circuit; a second circuit, which forms a second resonant circuit, wherein the first circuit is electrically conductively connected to the second circuit; and a third circuit, which forms a third resonant circuit, wherein the third circuit is electrically conductively connected to the second circuit.

19 Claims, 10 Drawing Sheets

(56) References Cited

U.S. PATENT DOCUMENTS

| | | | |
|---|---|---|---|
| 2010/0289608 A1* | 11/2010 | Nabeshima | H01F 17/0006 336/65 |
| 2011/0084888 A1* | 4/2011 | Nishioka et al. | 343/728 |
| 2012/0018505 A1* | 1/2012 | Jiang et al. | 235/375 |
| 2012/0074233 A1* | 3/2012 | Finn et al. | 235/492 |
| 2015/0090800 A1* | 4/2015 | Egli et al. | 235/492 |

OTHER PUBLICATIONS

German Office Action for DE102013102051; Dec. 2, 2013; 8 pages.
Schwingkreis, Dec. 21, 2012 Wikipedia (online); 13 pages.
Lecher-Leitung, Dec. 6, 2012 Wikipedia (online) ; 3 pages.
Chipkarte, Jan. 29, 2013 Wikipedia (online); 6 pages.

\* cited by examiner

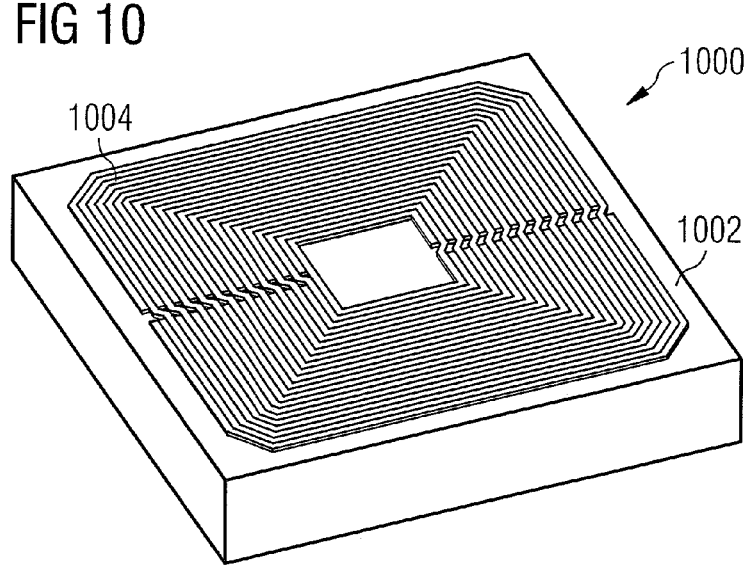
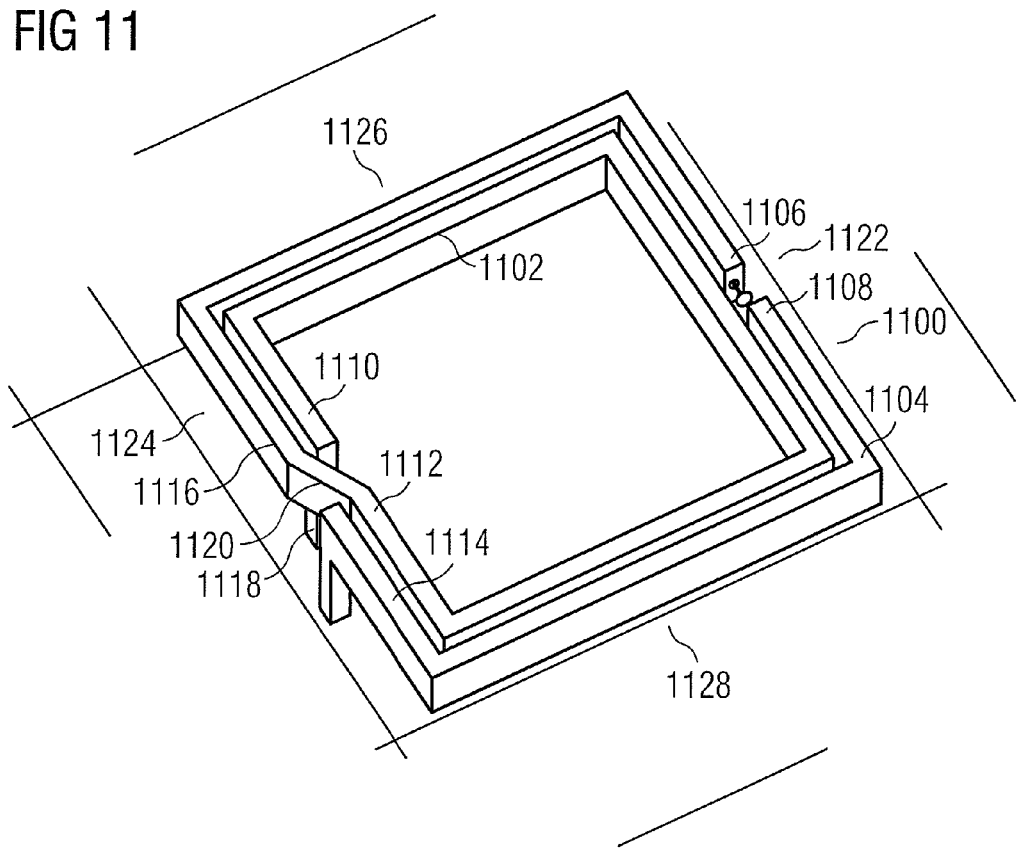

US 9,646,242 B2

BOOSTER ANTENNA, CONTACTLESS CHIP ARRANGEMENT, ANTENNA STRUCTURE AND CHIP ARRANGEMENT

CROSS-REFERENCE TO RELATED APPLICATION

This application claims priority to German Patent Application Serial No. 10 2013 102 051.8, which was filed Mar. 1, 2013, and is incorporated herein by reference in its entirety.

TECHNICAL FIELD

Various embodiments relate generally to a booster antenna, a contactless chip arrangement, an antenna structure and a chip arrangement.

BACKGROUND

In a conventional smart card which is in widespread use, for example, in the electronic payment transactions sector, the communication between the chip located on the smart card and a read device is contact-based, i.e. via smart card contacts exposed towards the outside of the smart card.

For this purpose, however, for use the smart card always needs to be inserted into a corresponding read device, which a user may find objectionable. A development which solves this problem provides so-called dual-interface smart cards, in which the chip, in addition to the conventional contact-based interface, can also communicate by means of a contactless interface. The contactless interface on the smart card can have a smart card antenna, which is contained in the smart card and is connected to the chip. The smart card antenna and the chip can be arranged together on a smart card module, in which case such a miniaturized form of the smart card antenna can then be referred to as a smart card module antenna. The joint arrangement of the coil and the chip on a smart card module is also referred to as CoM (coil on module). Irrespective of the type of smart card antenna, a galvanic connection is formed between said smart card antenna and the smart card module or the chip.

In an electronic payment system, for example, a functional distance of up to 4 cm between the chip and the read unit is required. However, meeting this setpoint input can prove to be problematic since, under certain circumstances, it is not possible for a sufficiently large smart card module antenna for enabling wireless communication at the required distance to be arranged on the small area which is available on the smart card module. In order to improve the performance of the contactless communication, in addition a so-called amplifier antenna (also referred to as booster antenna) can be built into a smart card and inductively coupled to the smart card module or the smart card module antenna arranged on the smart card module. Likewise, such a booster antenna can be inductively coupled to the CoM of a purely contactless smart card for improving the performance of the contactless communication. The booster antenna can be provided on a separate layer and contained in the smart card. The separate layer which contains the booster antenna can be or can have been laminated into the smart card during manufacture of the smart card, for example. The possible read or write distance between a write or read device and the smart card module is substantially increased by the booster antenna.

FIG. 1 shows a contactless smart card 100 with a smart card body 102, a booster antenna 104 integrated (for example laminated) therein and a contactless smart card module arrangement (for example also referred to as coil on module, CoM) 106, wherein the booster antenna 104 partially surrounds the contactless smart card module arrangement 106.

The booster antenna 104 is formed by a large ring-shaped conductor loop 108, wherein a small part of the conductor loop is formed to give a small conductor loop 110 which partially surrounds the contactless smart card module arrangement 106, for example a coil on module 106, which is arranged within a peripheral region of the large conductor loop 108.

Furthermore, there are several approaches and embodiments for so-called comprehensive UHF-HF antennas. The dimensions and outline dimensions of said antennas generally correspond to conventional RFID (radiofrequency identification) labels, such as in accordance with a smart card, for example, and are generally realized by means of a combination of a dipole and HF coil.

SUMMARY

In various embodiments, a booster antenna for a chip arrangement is provided. The booster antenna includes: a first circuit, which forms a first resonant circuit; a second circuit, which forms a second resonant circuit, wherein the first circuit is electrically conductively connected to the second circuit; and a third circuit, which forms a third resonant circuit, wherein the third circuit is electrically conductively connected to the second circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows a plan view of a chip with a (monolithically) integrated antenna structure in accordance with various embodiments;

FIG. 11 shows a plan view of a coil in accordance with various embodiments;

DESCRIPTION

Figure 1:
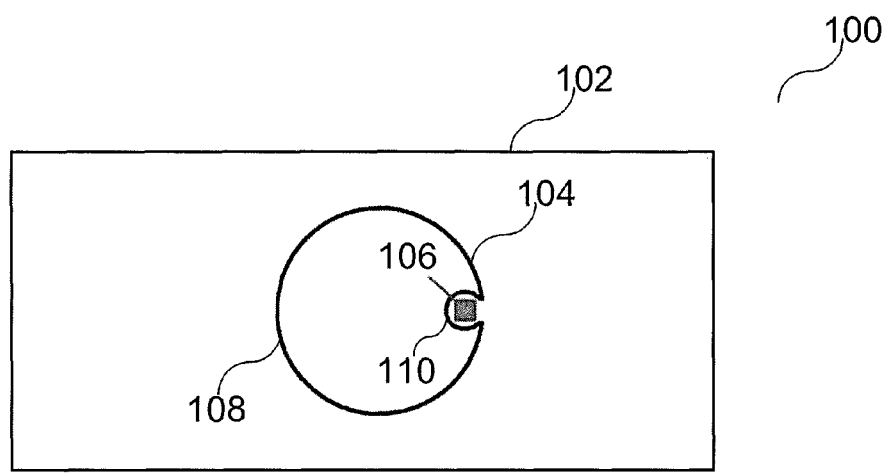
FIG. 1 shows a conventional contactless smart card including a smart card body, a booster antenna integrated therein, and a contactless smart card module arrangement.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In various embodiments, it is now possible for very small communication modules and/or chips with an integrated antenna to be read in various frequency bands.

In the following detailed description, reference is made to the attached drawings, which form part of this description and in which specific embodiments are shown, for illustrative purposes, in which the invention can be implemented. In this respect, directional terminology such as "at the top", "at the bottom", "at the front", "at the rear", "front", "rear", etc. is used with reference to the orientation of the described figure(s). Since components from embodiments can be positioned in a number of different orientations, the directional terminology is used for illustrative purposes and is in no way restrictive. It goes without saying that other embodiments can be used and structural or logic amendments can be made without departing from the scope of protection of the present invention. It goes without saying that the features of the various exemplary embodiments described herein can be combined with one another if not specifically specified otherwise. The following detailed description should therefore not be interpreted in a restrictive sense, and the scope of protection of the present invention is defined by the attached claims.

In the context of this description, the terms "connected" and "coupled" are used to describe both a direct and an indirect connection and a direct or indirect coupling. In the figures, identical or similar elements have been provided with identical reference symbols, where expedient.

In various embodiments, a combination of one or more UHF booster antennas (UHF: ultrahigh frequency) and one or more HF booster antennas (HF: high frequency) is provided. By targeted geometric arrangement of the individual components, it is now possible to read even very small communication modules and/or chips with an integrated antenna in various frequency bands. A UHF booster antenna can be designed to transmit or receive electromagnetic waves with a frequency in a range of approximately 0.3 GHz to approximately 3 GHz. Furthermore, an HF booster antenna can be designed to transmit or receive electromagnetic waves with a frequency in a range of approximately 0.3 kHz to approximately 30 MHz.

If a UHF chip is attached at the predetermined point (also referred to as coupling region, clearly the region in which the second electrical circuit is provided for producing inductive coupling to a chip or another object), the booster antenna clearly acts as a UHF tag. If an HF OCA (OCA: On-Chip Antenna, chip with (monolithically) integrated antenna) is used, a conventional HF transponder is produced.

In addition, in various embodiments, there is the possibility of using one or more chips with a special on-chip antenna, with the result that the system functions in a similar way to a so-called comprehensive transponder. That is to say that both the chip and the booster antenna can operate at both frequencies (or frequency ranges). This results in a comprehensive transponder system.

Clearly, in various embodiments, as also in the case of standard comprehensive antennas, an outgoing line of the dipole is combined with an HF coil in a booster antenna. In various embodiments, in the case of the comprehensive booster antenna, clearly a center tap of the secondary coupling element (i.e. the coupling element which is intended for inductive coupling to a chip) is provided. While, in various embodiments, the entire secondary coupling coil can be used for HF, for UHF, for example, only the inner part of the coil winding is used. Thus, ideal coupling for both frequency bands is possible.

Clearly, in various embodiments, a different coil feed from a UHF dipole and an HF coil is provided in a booster antenna.

In various embodiments, an HF tuned circuit (as an example of the first electrical circuit) with a large coil supplies the HF resonant circuit with a small coupling coil (as an example of the second electrical circuit). Said small coupling coil has a plurality of coil turns in order to achieve a correspondingly high inductance for HF. The UHF dipole (embodied as IFA in the figure) is only connected to the inner coil turns of this coupling coil. This results in a high inductive impedance in the rest of the coil turns with respect to the outside and the UHF path cannot be short-circuited by the required HF capacitance. Therefore, the HF antenna structure and the UHF antenna structure, i.e. on the same coupling structure, produce a magnetic field which can be used, for example, for inductive coupling to OCAs or CoMs.

Figure 2:
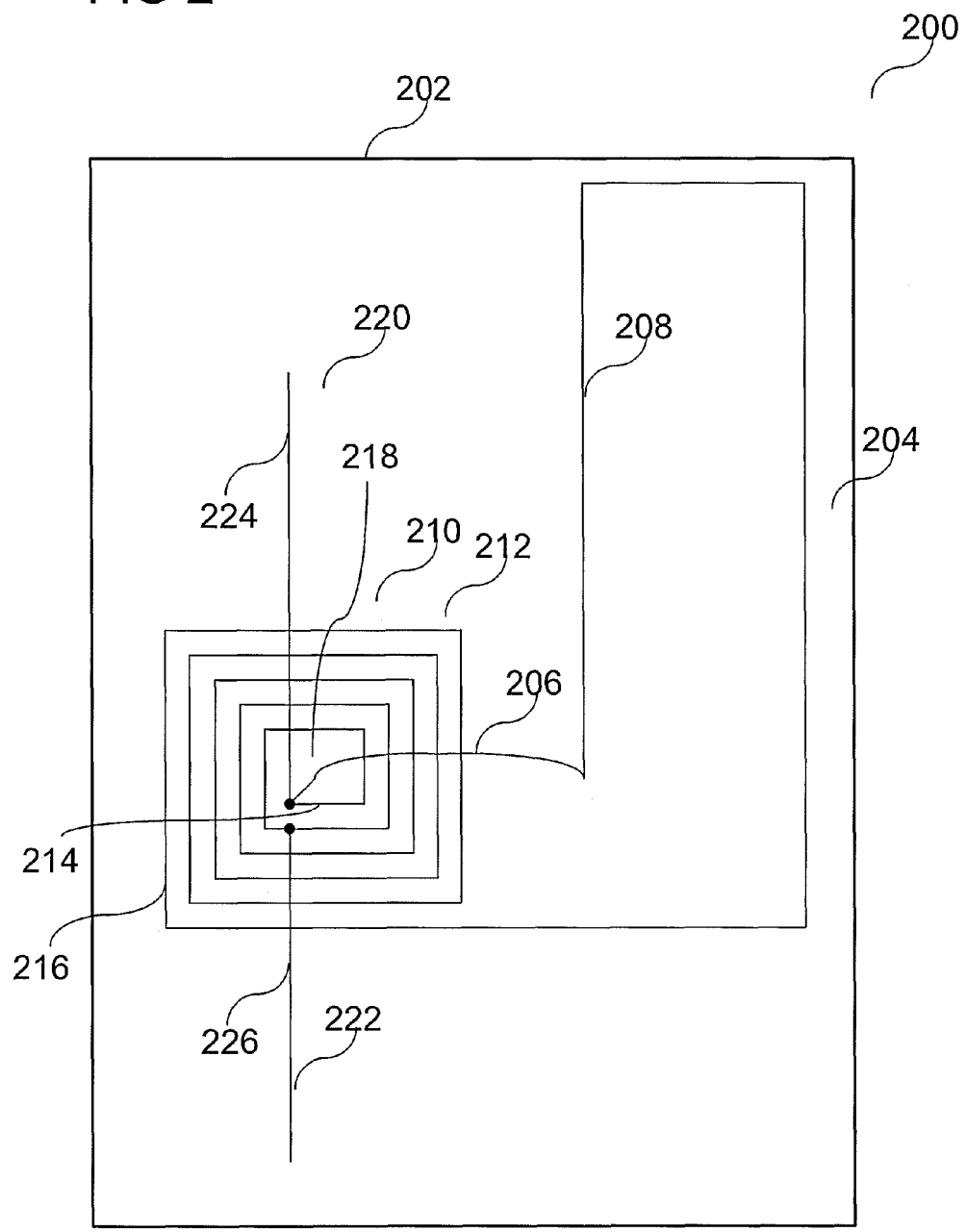
FIG. 2 shows a booster antenna in accordance with various embodiments.

FIG. 2 shows a booster antenna 200 in accordance with various embodiments.

The booster antenna 200, which is provided, for example, for a chip arrangement, for example for a smart card, can have a carrier 202 and a first circuit 204, which is applied on the carrier 202 and which forms a first resonant circuit. The first circuit 204 can have a first coil 206 with at least one coil turn 208. The first electrical circuit 204 can form a coupling region for inductive coupling to a write and/or read device (not illustrated). The carrier 202 can be, for example, a film, for example a plastic film.

In another configuration, the coupling region for coupling to a write and/or read device can be formed by a conductor loop.

The size of the conductor loop or of the first coil 206 can, in various embodiments, be limited substantially by the external dimensions of a carrier substrate (in other words the carrier 202) or else, for example, the chip arrangement, for example the smart card, itself if, for example, the carrier 202 is integrated in the chip arrangement (for example is laminated into the smart card body). In order to obtain as large an area as possible through which the electromagnetic alternating field passes, the shape of the conductor loop or coil can be matched to the shape of the substrate or the chip arrangement, for example the smart card. In addition, in respect of the configuration of the shape and size of the conductor loop or coil, standards such as, for example, ISO 7816 can be taken into consideration, which standards define regions which need to be kept free for writing, embossing or the like on the cards of electrical components such as conductor tracks.

In one configuration, the winding direction of the coil turn(s) 208 can have the same winding sense.

In another configuration, the coupling region for coupling to a write and/or read device can be formed by an HF antenna structure.

The booster antenna 200 can also have a second circuit 210 which is applied to the carrier 202 and forms a second resonant circuit. The second circuit 210 can have a second coil 212 with at least one coil turn 214, 216. In various embodiments, a plurality of coil turns 214, 216 can be provided, wherein the plurality of coil turns 214, 216 can have at least one inner coil turn 214 and at least one outer coil turn 216 running around the inner coil turn 214. The second electrical circuit 210 can form a coupling region 218 for inductive coupling to a chip (not illustrated).

In another configuration, the inductive coupling region 218 can be part of the second electrical circuit 210, wherein the inductive coupling region 218 can be substantially congruent with the contactless chip module, for example the contactless smart card module.

In another configuration, the inductive coupling region 218 can be formed by a conductor loop.

In another configuration, the inductive coupling region 218 can be defined by a coil, for example by the innermost coil turn 214 of the coil 212.

In another configuration, the inductive coupling region 218 of the booster antenna 200 for coupling to a chip can be arranged completely within the further coupling region for coupling to a write and/or read device.

In another configuration, the inductive coupling region 218 of the booster antenna 200 for coupling to a chip can be arranged completely outside the further coupling region for coupling to a write and/or read device.

The booster antenna 200 can furthermore have a third circuit 220, which is applied to the carrier 202 and forms a third resonant circuit. The third circuit 220 can have a dipole antenna 222 or be formed thereby. The dipole antenna 222 can have two electrical (for example straight linear) lines 224, 226, wherein a first line 224 is electrically conductively connected with its first end, for example, to the innermost end of the inner coil turn 214 of the second coil 212 (the second end of the first line 224 is free), and wherein a second line 226 is electrically conductively connected with its first end, for example, likewise to an inner coil turn 214 of the second coil 212 (the second end of the second line 226 is free). The first line 224 and the second line 226 extend away from one another, but lie along a common straight line.

The dipole antenna 222 can, however, in alternative configurations, also have another desired or suitable shape, for example a shape such as is explained in further detail below.

Figure 3:
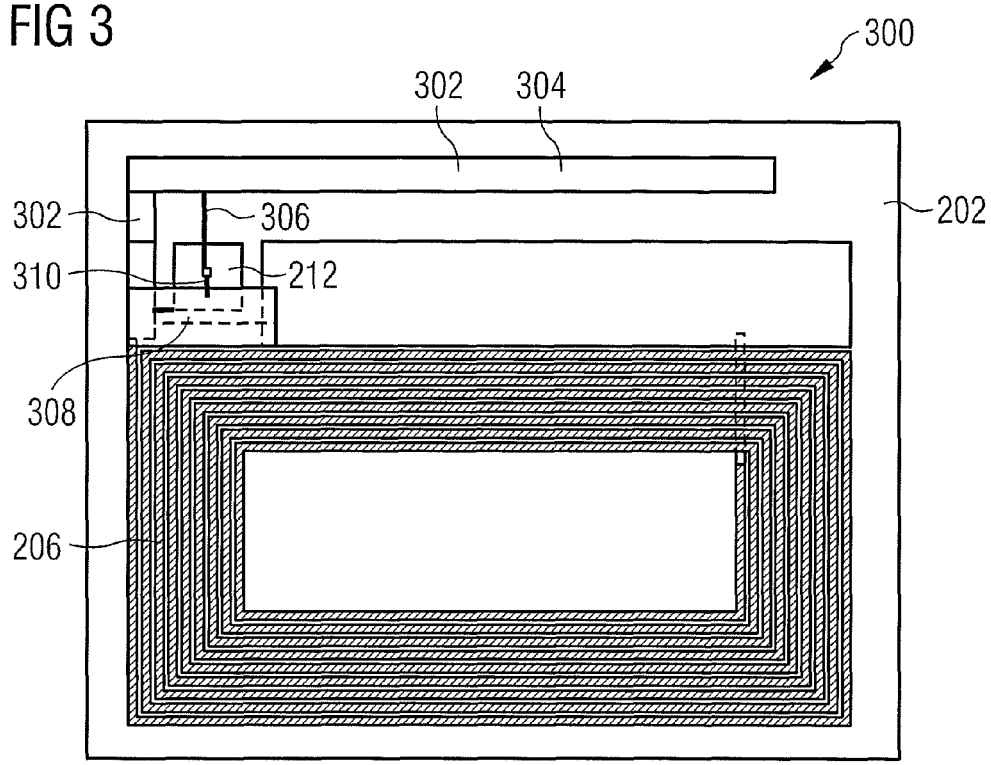
FIG. 3 shows a booster antenna in accordance with various embodiments.

FIG. 3 shows a booster antenna 300 in accordance with various embodiments.

The booster antenna 300 shown in FIG. 3 has a similar design to the booster antenna 200 shown in FIG. 2, for which reason only the differences between the two booster antennas are illustrated below.

In the case of the booster antenna 300 shown in FIG. 3, the dipole antenna is in the form of an inverted F antenna (IFA) 302. Furthermore, the second coil 212 in this embodiment has a large number of coil turns 214, 216, wherein a large number of inner coil turns 214 and a large number of outer coil turns 216 are provided. As illustrated in FIG. 3, a first (uppermost) (transverse) limb 304 of the "F" of the IFA 302 is electrically conductively connected to a first inner coil turn 214 of the second coil 212 by means of a first electrically conductive line 306. In addition, a second (central) (transverse) limb 308 of the "F" of the IFA 302 is electrically conductively connected to a second inner coil turn 214 of the second coil 212 by means of a second electrically conductive line 310.

Figure 4:
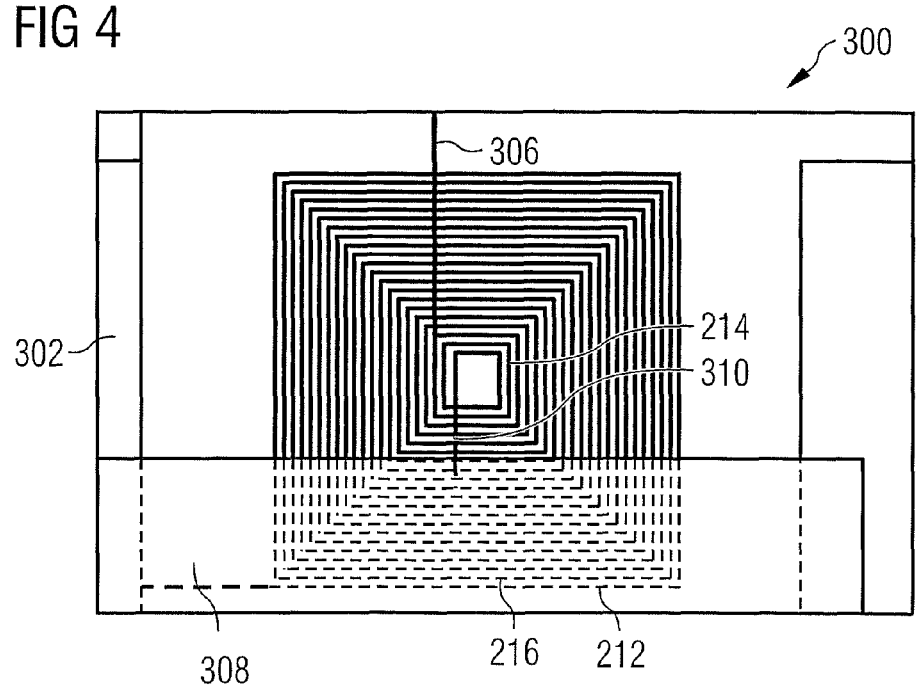
FIG. 4 shows an enlarged detail of the top left region of the booster antenna shown in FIG. 3.

FIG. 4 shows an enlarged detail of the top left region of the booster antenna 300 shown in FIG. 3.

In various configurations, the first circuit can form the first resonant circuit with a first phase resonance, and the second circuit can form the second resonant circuit with a second absolute resonance.

Figure 5:
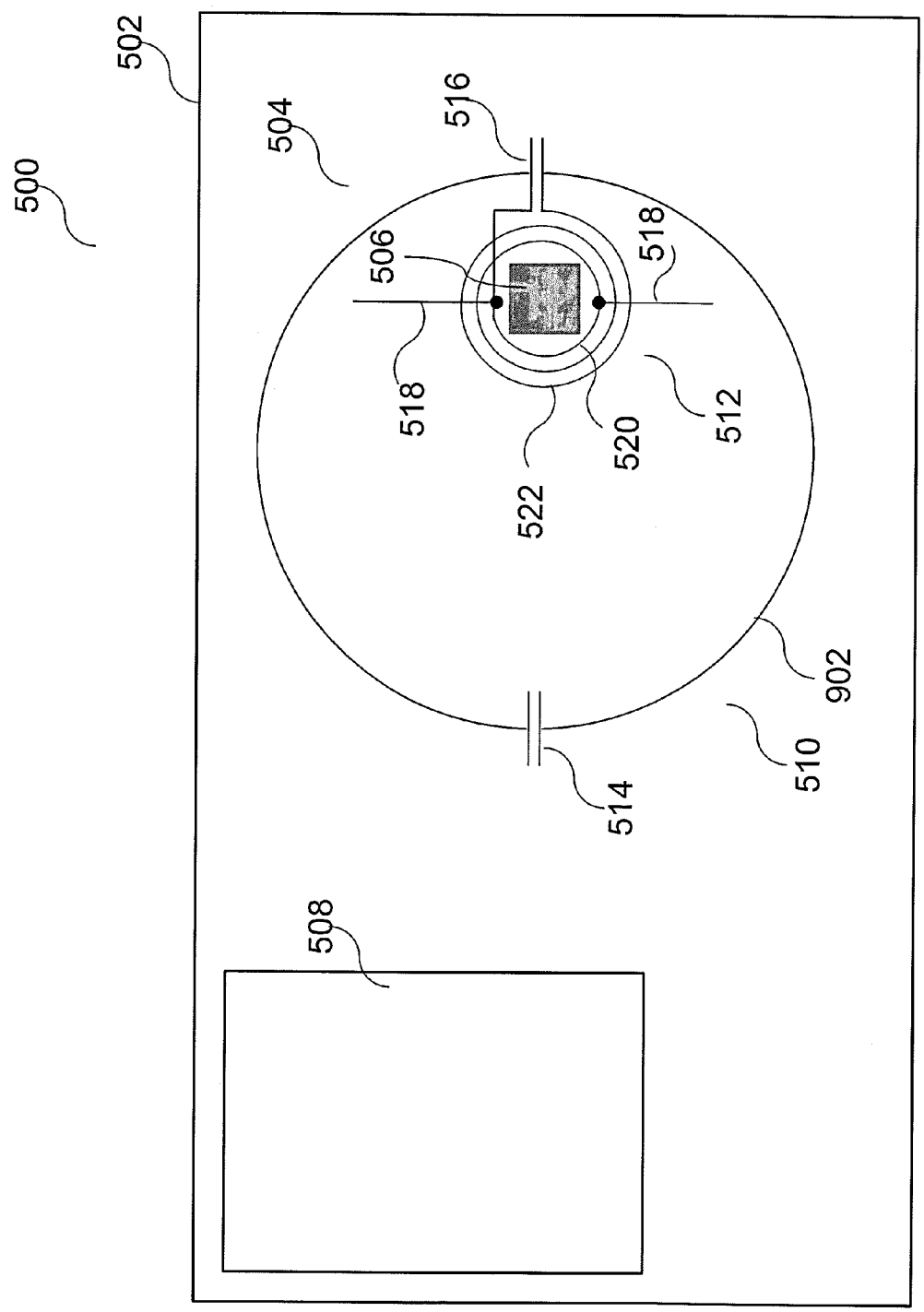
FIG. 5 shows a smart card with a booster antenna in accordance with various embodiments.

FIG. 5 shows a smart card 500 with a booster antenna 504 in accordance with various embodiments.

It should be noted that even if various exemplary embodiments are explained with reference to a smart card 500, alternative embodiments can also be provided in other application areas. Thus, for example, the booster antenna 504 can also be arranged on a different carrier, for example a flexible carrier, for example a textile carrier (for example a patch, for example an adhesive patch). The chip module also does not necessarily need to be implemented as a smart card module, but can be, for example, a chip module which can be implanted beneath the skin of a living organism, for example.

The booster antenna 504 shown in FIG. 5 has a similar design to the booster antenna 200 shown in FIG. 2, for which reason only the differences between the two booster antennas will be illustrated below.

The smart card 500 has a smart card body 502 and a booster antenna 504 in accordance with various embodiments. In addition, the smart card 500 has a contactless smart card module 506, for example an on-chip antenna (OCA) or a chip on module (CoM). In various embodiments, the booster antenna 504 is integrated, for example laminated, into the smart card body 502.

The contactless smart card module 506 can have a chip and a coil, which is electrically coupled (for example electrically conductively connected) to the chip, for example by means of a conductor track. The booster antenna 504 can be inductively coupled to the coil of the contactless smart card module 506 (also referred to as contactless smart card module) by means of the at least one inductive coupling region 218 of the booster antenna 504, as has been described above and will also be explained in more detail below. In addition, the booster antenna 504 can have at least one further coupling region for inductive coupling to a write and/or read device.

The smart card 500 and therefore also the contactless smart card module arrangement can be designed as a purely contactless smart card module arrangement. Alternatively, the smart card 500 and therefore also the contactless smart card module arrangement can optionally additionally have a contact-based smart card interface (for example a contact array 508 including a multiplicity of electrically conductive contacts), for example in the form of smart card contacts (for example in accordance with ISO 7816), and can therefore be designed as a dual-interface smart card module arrangement.

The booster antenna 504 can have the first electrical circuit, which forms a first resonant circuit with a first phase resonance, and the second electrical circuit, which forms a second resonant circuit with a second absolute resonance. The first electrical circuit and the second electrical circuit are coupled, for example electrically, to one another.

The booster antenna 504 can have substantially two conductor loops 510, 512, a large conductor loop 510 and a small conductor loop 512. The small conductor loop 512 surrounds the CoM 506 or the OCA 506. The large conductor loop 510 is electrically conductively connected with its ends to the ends of the small conductor loop 512 and partially surrounds the small conductor loop 512. A second capacitor 516, which is part of the second electrical circuit, is connected in parallel with the ends of the two conductor loops 510, 512. In addition, the large conductor loop 510 has, in its left-hand region, a first capacitor 514, which is connected in series. Furthermore, a dipole antenna 518 is provided as third circuit, wherein the dipole antenna 518 is electrically conductively connected to an inner coil turn 520 of the coil 522 of the second circuit. A first inductance of the first coupling region of the first circuit and a second inductance of the second coupling region of the second circuit of the booster antenna 500 are each in the form of a conductor loop 510, 512 (a first, large conductor loop 510 and a second, small conductor loop 512), wherein the second conductor loop 512 of the second coupling region can be arranged eccentrically within the first conductor loop 510. The first conductor loop 510 can be interrupted in its left-hand region, wherein the ends of the first conductor loop 510 are in the form of a T at the point of interruption and therefore form a plate capacitor, namely the first capacitor 514. The ends of the conductor loops 510, 512 in the right-hand region of the booster antenna 500 are electrically conductively connected to one another via lines, which run parallel to one another and extend beyond the first conductor loop 510; the lines running parallel form in turn a plate capacitor, namely the second capacitor 516. The capacitance of this second capacitor 516 is the capacitance of the parallel resonant circuit. The second conductor loop 512 has a coil with a plurality of, for example three (alternatively two, four, five, six, seven or more), coil turns.

Therefore, the booster antenna 500 has, in various embodiments, a separate design of two resonant circuits (a series resonant circuit (formed by the first electrical circuit) and a parallel resonant circuit (formed by the second electrical circuit)), which can have the same phase resonance and absolute resonance. If the second tuned circuit is in the form of a parallel resonant circuit, for example, a current increase takes place within the circuit. These currents in the branches of the parallel resonant circuit can be a great deal higher than the input current, corresponding to the Q factor of the circuit. In simple terms, the series resonant circuit (also referred to as series tuned circuit), in which the current is induced, supplies power to the parallel resonant circuit (also referred to as the parallel tuned circuit), in which a renewed increase in current then takes place. This increase in current can be proportional to the Q factor of the respective parallel tuned circuit.

Figure 6:
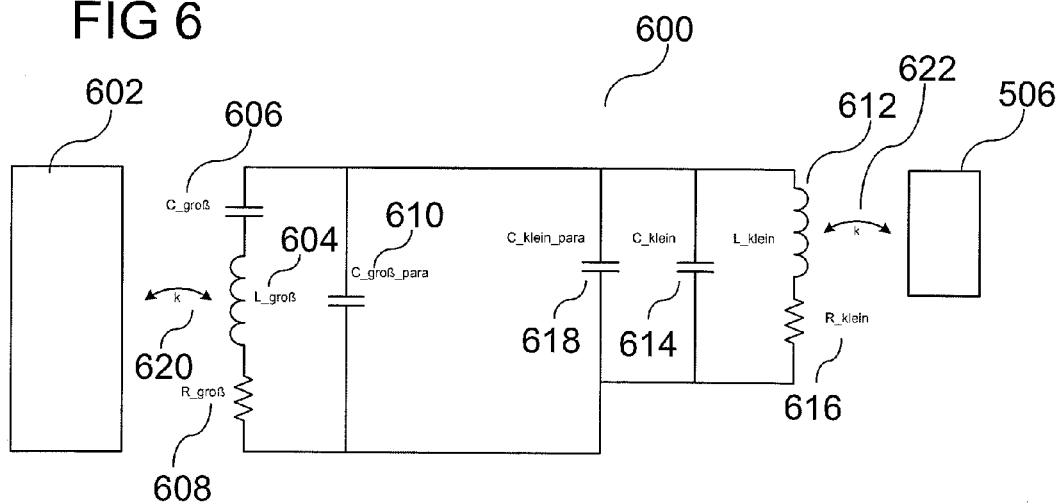
FIG. 6 shows a real equivalent circuit diagram of the booster antenna shown in FIG. 5.

FIG. 6 shows a real equivalent circuit diagram 600 of the booster antenna 500 shown in FIG. 5.

Furthermore, FIG. 6 shows a write/read apparatus 602, which is coupled inductively to the smart card 500 (by means of a first inductive coupling 620) and is therefore coupled, by means of the booster antenna 500, in turn inductively, to the contactless smart card module 506 (by means of a second inductive coupling 622).

The real equivalent circuit diagram 600 of the booster antenna 500 shown in FIG. 5 has, on the coupling side with respect to the write/read apparatus 602, a first inductance ($L_{large}$) 604, a first capacitor ($C_{large}$) 606, a first ohmic resistance ($R_{large}$) 608 and a (negligible) first parasitic capacitance ($C_{large\_para}$) 610 of the large conductor loop, and a second inductance ($L_{small}$) 612, a second capacitor ($C_{small}$) 614, a second ohmic resistance ($R_{small}$) 616 and a (negligible) second parasitic capacitance ($C_{small\_para}$) 618 of the small conductor loop.

Figure 7:
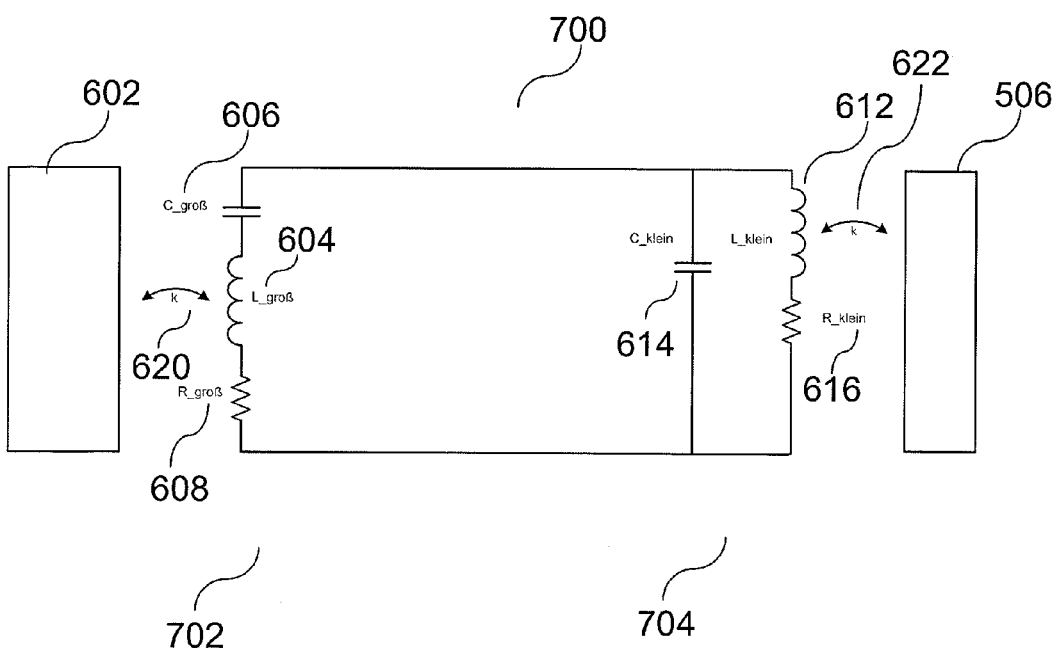
FIG. 7 shows a simplified equivalent circuit diagram of the booster antenna shown in FIG. 5.

Disregarding the parasitic components gives the simplified equivalent circuit diagram 700 shown in FIG. 7.

The simplified equivalent circuit diagram 700 now only has the first inductance ($L_{large}$) 604, the first capacitor ($C_{large}$) 606, the first ohmic resistance ($R_{large}$) 608 of the large conductor loop, and the second inductance ($L_{small}$) 612, the second capacitor ($C_{small}$) 614, and the second ohmic resistance ($R_{small}$) 616 of the small conductor loop.

As can be seen from the simplified equivalent circuit diagram 700, the components in the large conductor loop form a series resonant circuit (in other words the first electrical circuit), and the components in the small conductor loop form a parallel resonant circuit (in other words the second electrical circuit); the series resonant circuit 702 is in this case connected in series with the capacitance of the parallel resonant circuit 704. The first inductive coupling (k) 620 to the write and/or read device (reader) 602 is performed via the first inductance 604 of the large conductor loop; the coupling to the CoM or the OCA, generally the contactless smart card module 506, is performed via the second inductance 612 of the small conductor loop.

The phase resonances of the tuned circuits 702, 704 can be determined using the following formulae:

$$fr_{small} = \frac{1}{2 \cdot Pi} \cdot \sqrt{\frac{1}{L_{ksmall}C_{small}} - \frac{R_{small}^2}{L_{ksmall}^2}}, \quad (1)$$

$$fr_{large} = \frac{1}{2 \cdot Pi \cdot \sqrt{L_{large}C_{large}}}. \quad (2)$$

In the present case, the two resonant circuits 702, 704 can be dimensioned such that the phase resonance for the series resonant circuit 702 and the absolute resonance for the parallel resonant circuit 704 are 13.56 MHz.

Figure 8A:
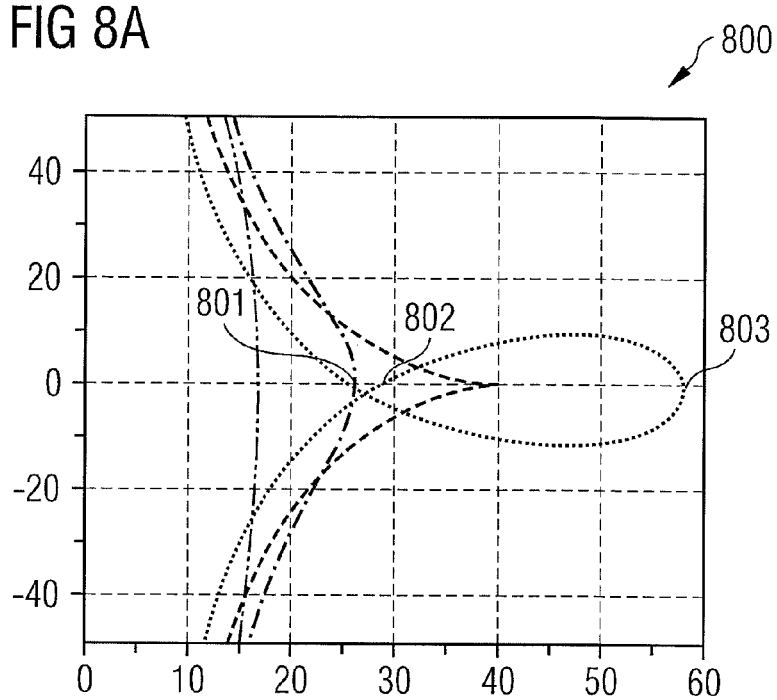
FIGS. 8A and 8B show the associated locus curves and the profile of the absolute value (in an absolute value graph) of the circuit illustrated in FIG. 7.
Figure 8B:
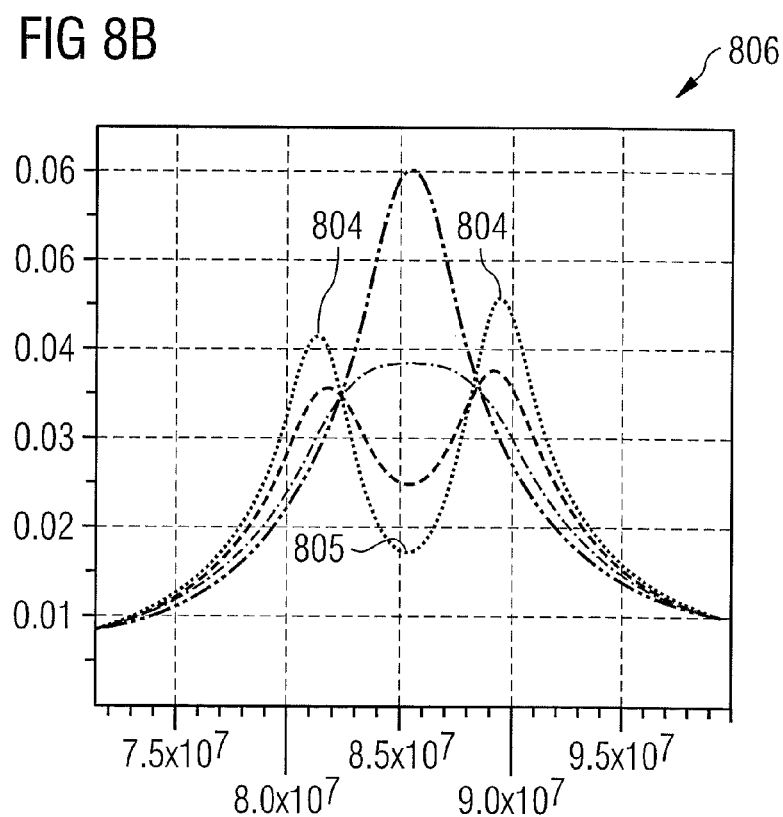

FIG. 8A and FIG. 8B show the associated locus curves in a locus curve graph 800, and the profile of the absolute value (in an absolute value graph 801) with different Q factors of the second tuned circuit. It can be seen that, above a specific Q factor of the second tuned circuit, up to three phase resonances (first phase resonance 801, second phase resonance 802 and third phase resonance 803) of the overall system are possible. This is also illustrated by means of extreme points of two peaks 804 and 805 in an absolute value graph 806.

The figures show that, in the second resonance case (first phase resonance 803 and associated absolute value minimum 805), the impedance now only has the real component. These points correspond to the operating frequency of the booster antenna. If the Q factor of the first series tuned circuit were to be changed, the curves illustrated in the locus curve graph 800 would shift along the x axis.

Figure 9:
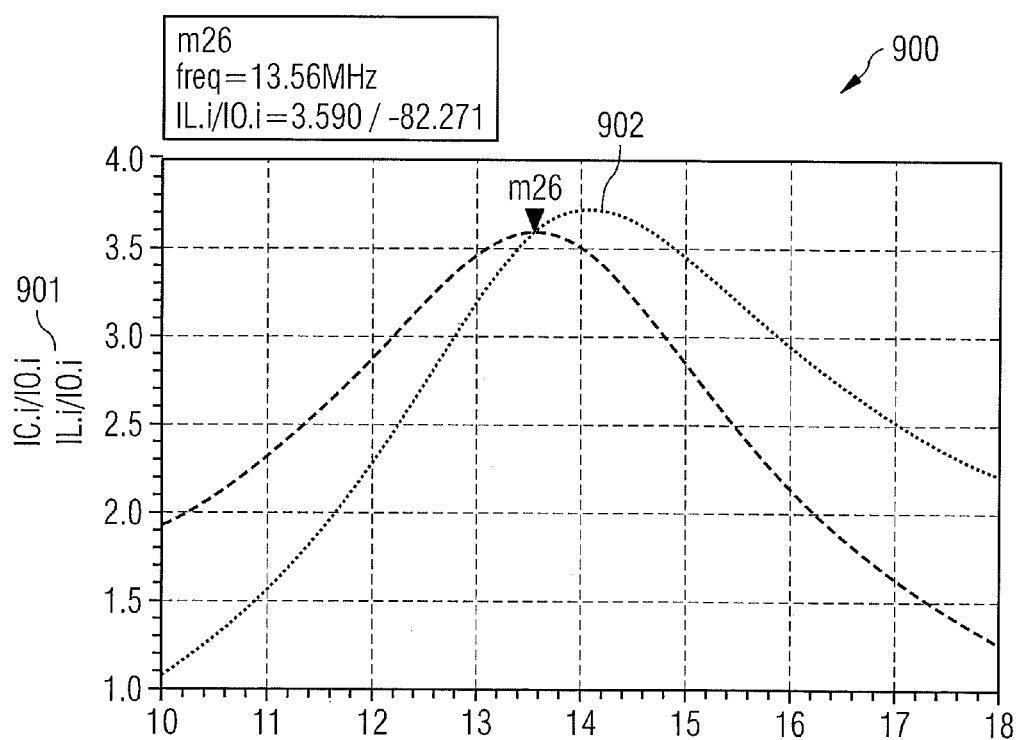
FIG. 9 shows the ratio of the currents which flow in the second circuit to the current which is induced in the first circuit, given a corresponding Q factor of the second resonant circuit (in a current graph)

FIG. 9 shows a current graph 900. Here, the ratio of the currents 901 which flow in the second circuit (IL and IC) to the current which is induced in the first circuit is illustrated given a corresponding Q factor of the second resonant circuit.

FIG. 9 illustrates how the current in the coupling structure of the small inductance (second circuit) is markedly increased in comparison with the current in the large inductance (first circuit). The markedly increased current in the small conductor loop then brings about an intensified magnetic field, as a result of which the coupling to the contactless smart card module 506 is significantly improved.

The higher the Q factor of the second tuned circuit, the less the current maxima 902 are shifted with respect to the operating frequency. The ratio of the current rise 902 to the input current approximately corresponds to the Q factor of the second resonant circuit.

As has been described above, in general the first electrical circuit and the second electrical circuit can be designed such that the first phase resonance (i.e. the phase resonance of the first electrical circuit) and the second absolute resonance (i.e. the absolute resonance of the second electrical circuit) are identical. The first electrical circuit and the second electrical circuit can be designed (in other words dimensioned) such that the first phase resonance and/or the second absolute resonance is/are approximately 13.56 MHz.

The booster antenna in accordance with various configurations can be designed and dimensioned such that the smart card can be operated in the HF frequency range (for example by means of the first electrical circuit) or in the UHF frequency range (for example by means of the third electrical circuit).

The combined booster antenna, i.e. a booster antenna which, in accordance with various embodiments, supports a plurality of frequency bands, can now be used with HF-OCAs and/or UHF-OCAs.

By virtue of the use of a so-called comprehensive OCA, a comprehensive transponder which operates both at UHF and at HF is produced.

Various embodiments can be used, for example, in the following exemplary application:

A passive sensor device (OCA chip with one or more sensors) which is implanted under the skin of a living organism, for example a human, can be provided for reading biosignals such as temperature, glucose or the like.

This chip is supplied, for example, with energy via HF (the coupling structure produces sufficient energy for maintaining the operation of the chip). This HF energy comes from the direct vicinity; a base station or an energy harvester, which is implemented on the patch (on which the booster antenna can also be located). The measured sensor data are transmitted via UHF in various embodiments, however. This considerably increases the range. Patients in a hospital room can thus easily be monitored via a method which is simple to realize and not damaging to health.

A further exemplary application can be considered to be in a combination of trademark protection and logistics application, wherein UHF can be used for the logistics sector (EPC, evolved packet core, clearly communication via a 3GPP communications network), and wherein HF can be used for communication with the user as near-field communication (NFC).

By virtue of the use of one or more comprehensive booster antennas, the advantages of both frequency bands are combined. UHF provides a wide read/write range and is used universally in logistics. Packages can thus be localized and monitored easily.

The NFC application is of significance, for example, for the end consumer. In this case, detailed information on the product are called up from the direct vicinity, for example, by means of a mobile radio communications terminal with NFC capability.

FIG. 10 shows a plan view of a chip 1000 with a carrier 1002, for example including silicon (or another suitable semiconductor material or another suitable composite semiconductor material), and with an antenna structure 1004 (monolithically) integrated in the carrier 1002.

At least one circuit (not illustrated), for example a logic circuit and/or a memory circuit, is contained in the carrier 1002.

The chip 1000 therefore clearly represents an on-chip antenna (OCA).

As will be explained in more detail below, the chip 1000 represents a comprehensive antenna, which supports both HF and UHF.

By means of this design, the antenna described below can be operated at a plurality of different frequencies (or frequency ranges).

For example in applications with on-chip antennas, this variant enables a multifrequency band function which can be realized very easily.

By virtue of the specially shaped coil of the antenna structure 1004 described below of the chip 1000, a plurality of resonance cases result, which occur in different frequency bands, depending on the geometry.

This makes it possible to use the antenna structure 1004, owing to its small design, as a comprehensive on-chip antenna.

This (for example) RFID chip 1000 can therefore be operated at different frequencies.

The antenna structure 1004 can have a coil antenna having a plurality of coil turns, wherein the antenna structure is designed such that, in the case of a predetermined operating frequency of an antenna signal, a standing wave of the antenna signal is formed on said antenna structure. The antenna structure 1004 can have a Lecher line structure, as will be explained in more detail below.

This can be achieved, for example, by providing a special geometric structure of the coil.

Thus, the coil 1100 can have a structure as illustrated in plan view in FIG. 11, for example.

The coil 1100 can have two coil turns 1102, 1104, wherein a first coil turn 1102 runs substantially completely within a second coil turn 1104. A first coil connection 1106 and a second coil connection 1108 are provided at the respective ends of the coil 1100, to be precise, for example, at the outer second coil turn 1104. The corresponding potential difference of the antenna signal needs to be provided at the two coil connections 1106, 1108. Over the course of the two coil turns 1102, 1104, the two coil turns intersect one another, with the result that a respective connection 1110, 1112 of the first coil turn 1102 is connected (i.e. electrically conductively connected) in pairs to a respective connection 1114, 1116 of the second coil turn 1104. Expressed more precisely, this means that a first connection 1110 of the first coil turn 1102 is electrically conductively connected to a first connection 1114 of the second coil turn 1104 by means of a first connecting line 1118, and that a second connection 1112 of the first coil turn 1102 is electrically conductively connected to a second connection 1116 of the second coil turn 1104 by means of a second connecting line 1120, wherein the first connecting line 1118 and the second connecting line 1120 intersect one another, wherein the two connecting lines 1118, 1120 run one on top of the other and are electrically insulated from one another, for example by means of an oxide (for example silicon oxide) and/or by means of a nitride (for example silicon nitride) or one or more other insulating materials or insulating layers.

The coil 1100 has, for example, a rectangular (for example square) shape or a round shape (for example elliptical or circular shape). FIG. 11 shows the coil with a substantially square shape, wherein the coil has a first side 1122 (on which the coil connections 1106, 1108 are provided), a second side 1124 (on which the connecting lines 1118, 1120 are provided) opposite the first side, and a third side 1126, which electrically conductively connects the lines of the coil turns 1102, 1104 of the first side 1122 to the lines of the coil turns 1102, 1104 of the second side 1124 at their first ends, and a fourth side 1128, which electrically conductively connects the lines of the coil turns 1102, 1104 of the first side 1122 to the lines of the coil turns 1102, 1104 of the second side 1124 at their second ends.

This structure can be provided so as to be repeated as often as desired in the antenna structure 1004, with the result that, for example, the antenna structure 1004 illustrated in FIG. 10 is produced.

Figure 12:
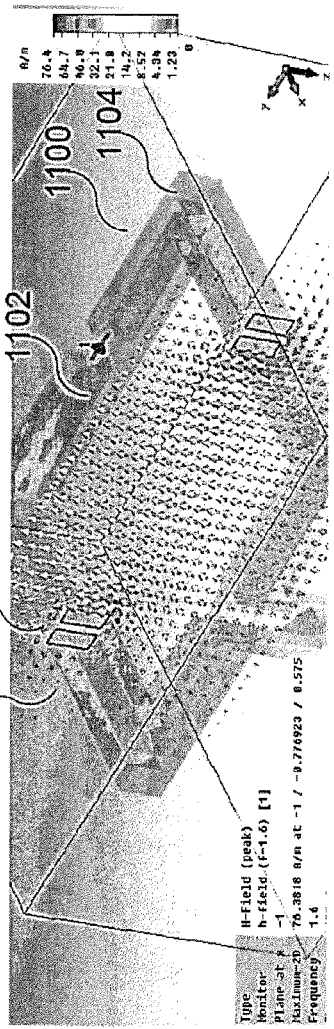
FIG. 12 shows a simulation illustration of a first resonance case in the coil shown in FIG. 11.

A first resonant frequency results in the case of the antenna structure 1004 as in a conventional coil. In this case, the inductances and the parasitic chip capacitances rise and a resonance case arises, as is illustrated in a first simulation illustration 1200 in FIG. 12 for the coil 1100. As illustrated in FIG. 12, the strongest magnetic field forms in the coil 1200 in the first resonance case on the left-hand side, i.e. clearly approximately in the center 1202 of the lines of the coil turns 1102, 1104 on the third side 1126.

Figure 13:
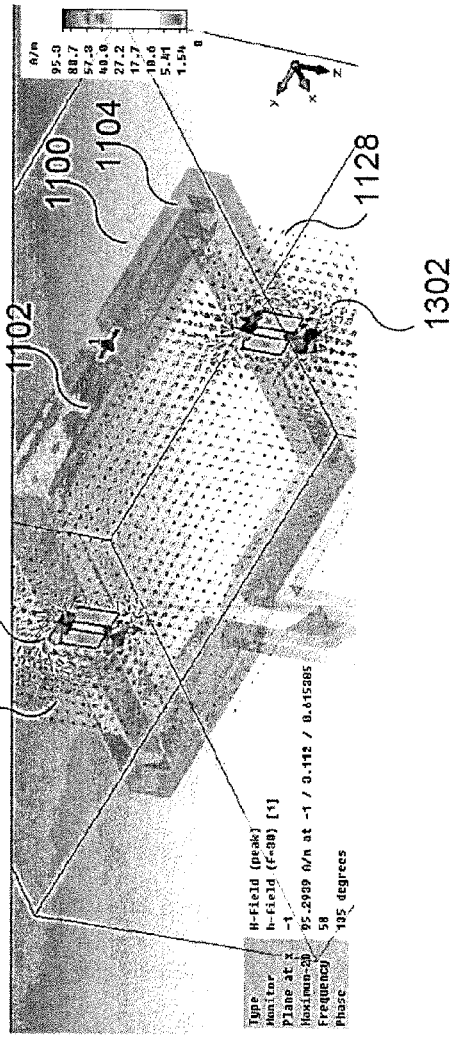
FIG. 13 shows a simulation illustration of a second resonance case in the coil shown in FIG. 11.

At relatively high frequencies, the wave propagation on the lines can be visualized as being in the case of a Lecher line. When the structure is selected such that a lambda (or a multiple) (i.e. a wavelength or a multiple of the wavelength of the antenna signal) propagates on the line, therefore, a second resonance case arises, as is illustrated in a second simulation illustration 1300 in FIG. 13 for the coil 1100. As illustrated in FIG. 13, in the second resonance case the strongest magnetic field forms in the coil 1200 both on the left-hand side, i.e. clearly approximately in the center 1202 of the lines of the coil turns 1102, 1104 on the third side 1126, and on the right-hand side, i.e. clearly approximately in the center 1302 of the lines of the coil turns 1102, 1104 on the fourth side 1128.

Figure 14:
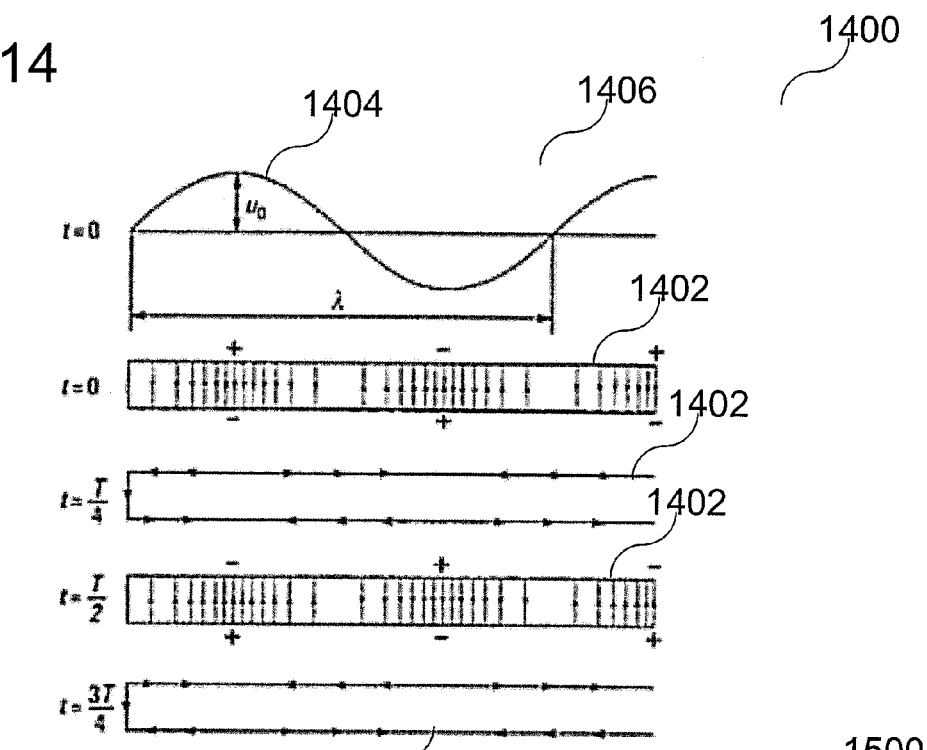
FIG. 14 shows an illustration of the propagation of a standing wave along a Lecher line at different times.

FIG. 14 shows an illustration 1400 of the propagation of a standing wave along a Lecher line 1402 at different times. Thus, at a time t=0, a sinusoidal electromagnetic wave 1404 with a wavelength 2 and a maximal amplitude up is illustrated in a first graph 1406. Furthermore, FIG. 14 shows, at the respective times t=0, t=T/4, t=T/2, and t=3T/4, the propagation of the magnetic field 1404 between the elements of the Lecher line 1402.

Figure 15:
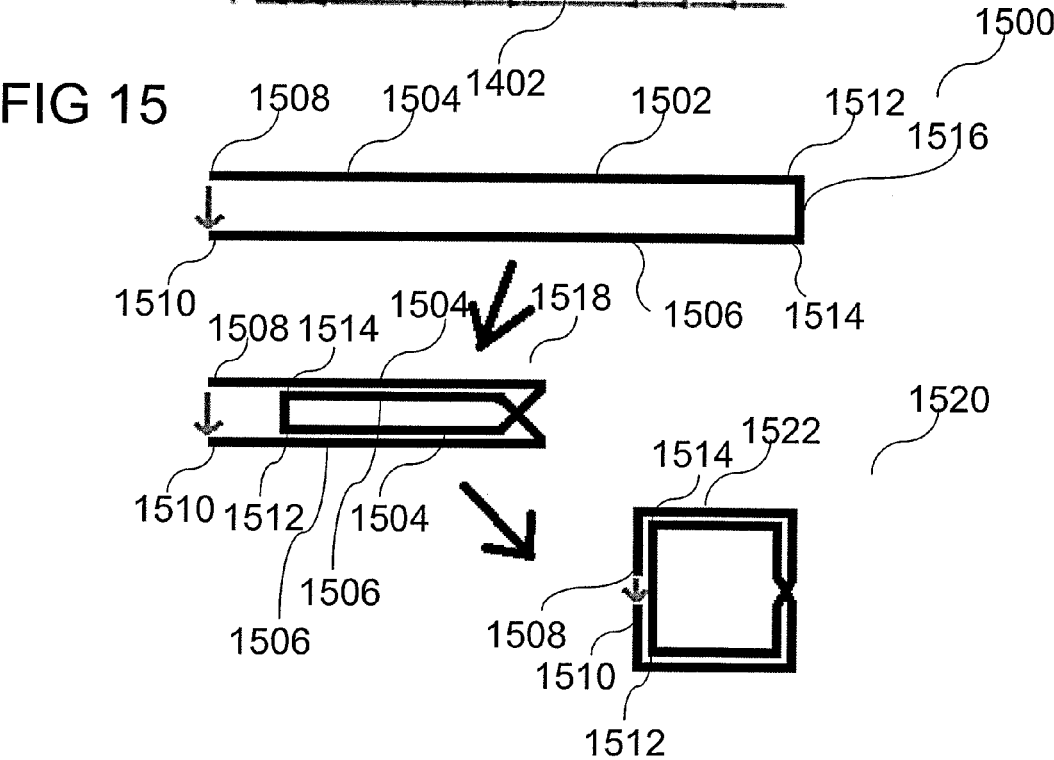
FIG. 15 shows a figurative explanation of the structure of the coil shown in FIG. 11, for which reason this structure likewise forms a Lecher line.

FIG. 15 shows a graphical explanation of the structure of the coil shown in FIG. 11, for which reason this structure likewise forms a Lecher line.

First, FIG. 15 shows, in a first illustration 1500, a conventional Lecher line 1502, which has a U-shaped profile. The Lecher line 1502 has two mutually opposite, parallel lines 1504, 1506, which are electrically insulated from one another at their first ends 1508, 1510 and are electrically conductively connected to one another at their second ends 1512, 1514 by means of an electrically conductive connecting element 1516.

Furthermore, FIG. 15 shows, in a second illustration 1518, that the Lecher line 1502 from the first illustration 1500 is firstly folded and secondly rotated through 180°. The corresponding end points of the Lecher line 1502 from the first illustration 1500 are correspondingly indicated in the second illustration 1518.

If the Lecher line 1502 from the second illustration 1518 still with the same dimensions in respect of the wave propagation is brought into a square form, the Lecher line structure 1522 as indicated in a third illustration 1520 results. This Lecher line structure 1522 corresponds to the structure of the coil 1100 as illustrated in FIG. 11 and as has been explained correspondingly above.

In various embodiments, a booster antenna for a chip arrangement, for example for a smart card, is provided, wherein the booster antenna includes: a first circuit, which forms a first resonant circuit; a second circuit, which forms a second resonant circuit, wherein the first circuit is electrically conductively connected to the second circuit; and a third circuit, which forms a third resonant circuit, wherein the third circuit is electrically conductively connected to the second circuit.

In one configuration, the first circuit can form the first resonant circuit with a first phase resonance; wherein the second circuit can form the second resonant circuit with a second absolute resonance.

In another configuration, the first electrical circuit and the second electrical circuit can be designed such that the first phase resonance and/or the second absolute resonance is/are approximately 13.56 MHz.

In another configuration, the third circuit can form the third resonant circuit with a third phase resonance.

In another configuration, the third electrical circuit can be designed such that the third phase resonance is greater than the first phase resonance.

In another configuration, the third electrical circuit can be designed such that the third phase resonance is in a range of approximately 0.3 GHz to approximately 3 GHz.

In another configuration, the third electrical circuit can be designed such that the third phase resonance is approximately 868 MHz.

In another configuration, the third circuit can have a dipole antenna.

In another configuration, the dipole antenna may include an inverted F antenna (IFA) or can be in the form of such an antenna.

In another configuration, the second electrical circuit can have an inductive coupling structure.

In another configuration, the first electrical circuit can be connected in series with the second electrical circuit.

In another configuration, the first resonant circuit and the second resonant circuit can be designed such that a first current in the first resonant circuit effects an increased second current, in comparison with the first current, in the second resonant circuit.

In another configuration, the first resonant circuit can be a series resonant circuit.

In another configuration, the second resonant circuit can be a parallel resonant circuit.

In another configuration, the second circuit can have at least one coil turn.

In another configuration, the second circuit can have a plurality of coil turns.

In another configuration, the second circuit can have an outer coil turn and a plurality of inner coil turns.

In another configuration, the third circuit can be electrically conductively connected only to the inner coil turns.

In another configuration, the booster antenna may furthermore include a flexible carrier, for example a patch;

wherein the first electrical circuit, the second electrical circuit and the third electrical circuit can be arranged on the flexible carrier.

In various embodiments, a contactless chip arrangement is provided, for example a contactless smart card module arrangement, including: a booster antenna, as has been described above and will be explained in more detail below; and a contactless chip module, for example a contactless smart card module, which includes: a chip; and a coil, which is electrically coupled to the chip; wherein the booster antenna is inductively coupled to the coil of the contactless chip module, for example the contactless smart card module, by means of at least one inductive coupling region of the booster antenna.

The chip arrangement can be any desired arrangement which has a chip, for example a portable arrangement with a chip. The booster antenna can be arranged, for example, on a flexible carrier as well, for example on a textile carrier, for example on a patch (for example on an adhesive patch).

By corresponding dimensioning and design of the individual components of the first electrical circuit and/or the second electrical circuit, a multiplicity of possible application cases is provided. Both the first and the second resonant circuit can be adjusted very easily to a specific phase resonance or absolute resonance by corresponding dimensioning of the circuit components. By virtue of the separate design, in addition the parameterization and verification of the booster antenna are considerably simplified.

In one configuration, the contactless chip module, for example contactless smart card module, can be a module with an integrated coil (coil on module, CoM) or a module with an integrated antenna (on-chip antenna, OCA).

In yet another configuration, the contactless chip module with an integrated coil (coil on module, CoM) or a module with an integrated antenna (on-chip antenna, OCA) can have a predeterminable, for example predefined, specific distance from the coupling element of the booster antenna.

In yet another configuration, the contactless chip module with an integrated coil (coil on module, CoM) or a module with an integrated antenna (on-chip antenna, OCA) can be located in a different matter (for example can be implanted in a muscle or in the body of a living organism).

In one configuration, the booster antenna can have at least one further coupling region for coupling to a write and/or read device.

In yet another configuration, the first electrical circuit can form the further coupling region for coupling to a write and/or read device.

In yet another configuration, the inductive coupling region can be part of the second electrical circuit; wherein the inductive coupling region can be arranged substantially congruently with the contactless chip module, for example the contactless smart card module.

In yet another configuration, the further coupling region for coupling to a write and/or read device can be formed by a dipole.

In yet another configuration, the inductive coupling region of the booster antenna for coupling to a chip can be arranged completely within the further coupling region for coupling to a write and/or read device.

In yet another configuration, the inductive coupling region of the booster antenna for coupling to a chip can be arranged completely outside the further coupling region for coupling to a write and/or read device.

In yet another configuration, the contactless chip module, for example the contactless smart card module, can also have chip contacts, for example smart card contacts, which can be designed to provide a contact-based chip interface, for example smart card interface.

In yet another configuration, the contactless chip arrangement, for example contactless smart card module arrangement, can be designed as a dual-interface chip module arrangement, for example as a dual-interface smart card module arrangement.

In various embodiments, a contactless chip arrangement is provided, for example a smart card, including: a chip module arrangement, for example a contactless smart card module arrangement, as has been described above and will be explained in more detail below.

It is thus possible, for example, to design and dimension the components of the circuits in such a way that it is possible to cause the first tuned circuit (in other words the first resonant circuit) to oscillate with an external, weak electromagnetic field, for example to set it to phase resonance or absolute resonance. The latter case would result in the magnitude of the impedance of the first series resonant circuit being at a minimum and the current induced in the first resonant circuit being at a maximum. The second circuit can likewise be excited by the first circuit being coupled to the second circuit. If the second tuned circuit is in the form of a parallel resonant circuit, for example, an increase in current occurs within the circuit. These currents in the branches of the parallel resonant circuit can be a great deal higher than the excitation current corresponding to the Q factor of the circuit.

As a result, in addition to the conventional geometric booster effect, an electromagnetic property which results in an electrical booster effect is also utilized.

In one configuration, at least part of the second electrical circuit of the booster antenna forms an inductive coupling region for coupling to an antenna of a chip module, for example a smart card module. The inductive coupling region can be provided, for example, by the formation of a conductor loop or a coil. For example, the shape of the conductor loop or the coil of the inductive coupling region of the booster antenna can correspond to or approximate the shape of the antenna of the contactless chip module, for example the contactless smart card module. Furthermore, provision can be made for the dimensions, in other words the size dimensions, of the conductor loop or the coil of the inductive coupling region of the booster antenna to also correspond to or at least approximate the shape of the antenna of the contactless chip module, for example the contactless smart card module. An improvement in the coupling between the booster antenna and the contactless chip module, for example the contactless smart card module, can also be achieved if the conductor loop or the coil of the inductive coupling region of the booster antenna tightly surrounds or is arranged congruently above or beneath the antenna of the contactless chip module, for example the contactless smart card module, with the result that a magnetic field produced by the coil or the conductor loop passes through the coil of the contactless chip module, for example the contactless smart card module, as efficiently as possible.

The first electrical circuit of the booster antenna can be, for example, an HF tuned circuit or form such an HF tuned circuit. The third electrical circuit of the booster antenna can be, for example, a UHF tuned circuit (for example a UHF dipole) or form such a UHF tuned circuit.

The second electrical circuit may include a plurality of coil turns and therefore at least one inner coil turn and at least one outer coil turn. The third electrical circuit and therefore, for example, the UHF dipole can, in various embodiments, only be electrically conductively connected to the inner coil turn(s).

As a result, a high inductive impedance of the remaining coil turns can be produced on the outside, and the UHF path cannot be short-circuited by the required HF capacitance.

It would appear that the first electrical circuit and the third electrical circuit are designed and electrically conductively connected or coupled to one another and to the second electrical circuit in such a way that the first electrical circuit and the third electrical circuit (i.e., for example, the HF tuned circuit and the UHF tuned circuit) produce a magnetic field on the same coupling structure (as an example of the second electrical circuit), which can be used for inductive coupling to an antenna on a chip or to an antenna on another object.

In various embodiments, an antenna structure is provided including a coil antenna including a plurality of coil turns, wherein the antenna structure is designed such that, at a predetermined operating frequency of an antenna signal, a standing wave of the antenna signal forms on said antenna structure.

In one configuration, the antenna structure can have a Lecher line structure or be formed by such a Lecher line structure.

In various embodiments, a chip arrangement is provided, including: at least one chip; and an antenna structure coupled to the chip, as has been described above and will be explained in more detail below.

In one configuration, the chip and the antenna structure can be applied to a common carrier.

In another configuration, the chip and the antenna structure can be applied in monolithically integrated fashion to a common carrier.

Embodiments of the invention are illustrated in the figures and will be explained in more detail below.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A booster antenna for a chip arrangement, the booster antenna comprising:
   a first circuit, which forms a first resonant circuit with a first phase resonance;
   a second circuit, which forms a second resonant circuit, wherein the first circuit is electrically conductively connected to the second circuit;
   a third circuit, which forms a third resonant circuit with a third phase resonance, wherein the third circuit forms a dipole antenna, wherein the dipole antenna is not short-circuited; and wherein the dipole antenna comprises an inverted F antenna; and
   wherein the second circuit comprises a coil comprising at least one coil turn where an end of an innermost coil turn is directly connected to an end of an electrical line of the dipole antenna.

2. The booster antenna of claim 1,
   wherein the second circuit forms the second resonant circuit with a second absolute resonance.

3. The booster antenna of claim 2,
   wherein the first electrical circuit and the second electrical circuit are designed such that at least one of the first phase resonance or the second absolute resonance is or are approximately 13.56 MHz.

4. The booster antenna of claim 1,
   wherein the third electrical circuit is designed such that the third phase resonance is greater than the first phase resonance.

5. The booster antenna of claim 1,
   wherein the third electrical circuit is designed such that the third phase resonance is in a range of approximately 0.3 GHz to approximately 3 GHz.

6. The booster antenna of claim 1,
   wherein the second electrical circuit has an inductive coupling structure.

7. The booster antenna of claim 1,
   wherein the first electrical circuit is connected in series with the second electrical circuit.

8. The booster antenna of claim 1,
   wherein the first resonant circuit is a series resonant circuit.

9. The booster antenna of claim 1,
   wherein the second resonant circuit is a parallel resonant circuit.

10. The booster antenna of claim 1, further comprising:
    a flexible carrier;
    wherein the first electrical circuit, the second electrical circuit and the third electrical circuit are arranged on the flexible carrier.

11. A contactless chip arrangement, comprising:
    a booster antenna comprising:
      a first circuit, which forms a first resonant circuit with a first phase resonance;
      a second circuit, which forms a second resonant circuit, wherein the first circuit is electrically conductively connected to the second circuit;
      a third circuit, which forms a third resonant circuit with a third phase resonance, wherein the third circuit forms a dipole antenna, wherein the dipole antenna is not short-circuited; wherein the dipole antenna comprises an inverted F antenna; and
      wherein the second circuit comprises a coil comprising at least one coil turn where an end of an innermost coil turn is directly connected to an end of an electrical line of the dipole antenna;
    a contactless chip module, which comprises:
      a chip; and
      a coil, which is electrically coupled to the chip;
      wherein the booster antenna is inductively coupled to the coil of the contactless chip module, by means of at least one inductive coupling region of the booster antenna.

12. The contactless chip arrangement of claim 11,
    wherein the booster antenna has at least one further coupling region for coupling to a write and/or read device.

13. The contactless chip arrangement of claim 12,
    wherein the first electrical circuit forms the further coupling region for coupling to at least one of a write device or read device.

14. The contactless chip arrangement of claim 12,
    wherein the further coupling region for coupling to at least one of a write device or read device is formed by a dipole.

15. The contactless chip arrangement of claim 12,
wherein the inductive coupling region of the booster antenna for coupling to a chip is arranged completely within the further coupling region for coupling to at least one of a write device or read device.

16. The contactless chip arrangement of claim 12,
wherein the inductive coupling region of the booster antenna for coupling to a chip is arranged completely outside the further coupling region for coupling to a at least one of a write device or read device.

17. The contactless chip arrangement of claim 11,
wherein the inductive coupling region is part of the second electrical circuit; and
wherein the inductive coupling region is arranged substantially congruently with the contactless chip module.

18. The contactless chip arrangement of claim 11,
wherein the contactless chip module further has chip contacts, which are designed to provide a contact-based chip interface.

19. The contactless chip arrangement of claim 11,
designed as a dual-interface chip module arrangement.

* * * * *